Sept. 17, 1929.   R. N. EHRHART   1,728,177
HEATER
Filed Dec. 19, 1921

INVENTOR
Raymond N. Ehrhart,

Patented Sept. 17, 1929

1,728,177

UNITED STATES PATENT OFFICE

RAYMOND N. EHRHART, OF EDGEWOOD, PENNSYLVANIA, ASSIGNOR TO ELLIOTT COMPANY, OF PITTSBURGH, PENNSYLVANIA, A CORPORATION OF PENNSYLVANIA

HEATER

Application filed December 19, 1921. Serial No. 523,430.

Figure 3:
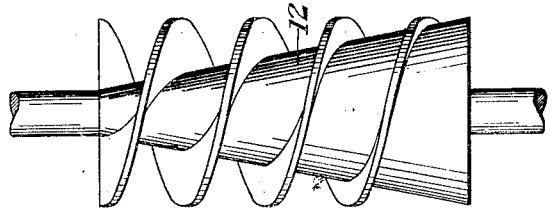
Figure 3 is a view, corresponding to Figure 2, illustrating a slightly modified form of spray nozzle.
Figure 2:
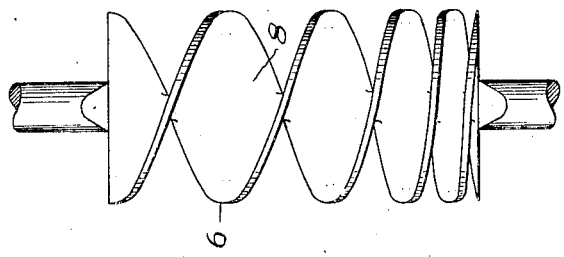
Figure 2 is a side elevation, partly broken away, of one form of spray nozzle which may be used with the improved heater.
Figure 1:
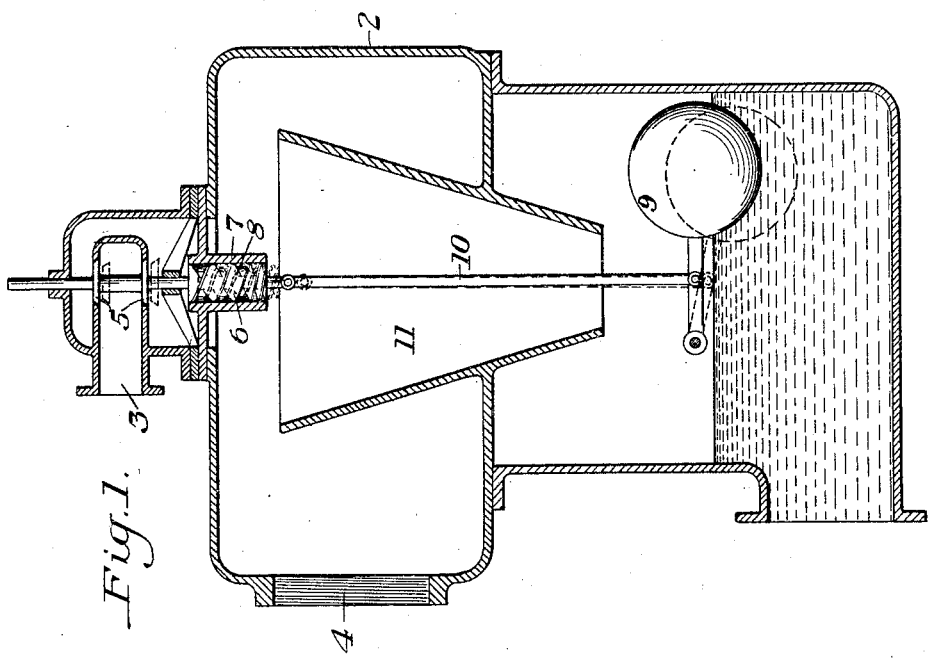
Figure 1 is a vertical sectional view through a heater embodying my invention, illustrating, in full lines, the parts in position to cut off flow of water, and in dotted lines, in position to admit water.

The present invention relates particularly to heaters of the type in which a liquid to be heated is brought, in finely divided condition, as in the form of a spray, into contact with a heating medium such as steam. With such heaters, varying amounts of liquid are heated at different times, and if a breaking up or spraying device is provided which is highly effective for one flow, it is inefficient for greater or lesser amounts of liquid. The present invention has for one of its objects the provision of means for effectively breaking up the liquid to be heated irrespective of the volume of flow, and for controlling such means automatically by the demands upon the heater.

The present drawings are merely illustrative of a conventional structure, and are not to be considered as limiting my invention, it being premised that changes may be made in the construction and operation of the heater without departing from the spirit of the invention or scope of my broader claims.

A heater constructed in accordance with the present invention may comprise a suitable casing 2 forming a heating chamber having a port 3 for the admission of the liquid to be heated. The heating fluid, such as steam, is adapted to enter the heating chamber through a port 4. The liquid to be heated passes from the port 3 through a valve 5 to a special form of spray nozzle 6. This spray nozzle may comprise a stationary member 7 and a movable member 8. This movable member may be formed of a twisted or cast body providing a plurality of passages for the liquid. These passages are of varying pitch, as shown, whereby a gradually changing cross-sectional area is presented to the travel of the liquid throughout the entire length of the nozzle. The movable member 8 may be connected in any desired manner with the valve 5 so as to move therewith. With such a construction, if the valve 5 opens a small distance to permit the passage of a relatively small amount of liquid to be heated, the movable member 8 will be moved out of the stationary member 7 a corresponding amount. This will necessitate the liquid to pass through a restricted passage before entering the heating chamber, whereby a rotational movement will be imparted to the liquid, which movement by virtue of its centrifugal force will tear the liquid to pieces in the form of a spray as it issues from the nozzle. As the valve 5 opens wider and wider to pass increasing amounts of liquid, the movable member 8 will be correspondingly moved whereby the liquid to be heated may enter the heating chamber through passages having the required cross-sectional area for imparting an effective rotary motion to the liquid. This construction is disclosed in my United States Patent No. 1,494,675 of May 20, 1924.

In order to make the supply of liquid to be heated proportional to the demand upon the heater the lower portion of the heater may be constructed to form a reservoir in which operates a float 9. As the demand upon the reservoir increases, the liquid therein will lower and the float 9 will drop. This movement will be transmitted by a link 10 to the valve and the spray nozzle whereby an efficient operation is produced.

Connecting the heating chamber and the reservoir is a mixing chamber 11 in which the liquid in the form of a spray and the heating fluid are brought into intimate contact whereby the desired heat transfer is produced.

In Figure 3 there is illustrated a slightly modified form of movable member for the spray nozzle, which member comprises a conical body portion 12 on which a spirally extending vane is formed in any desired manner. This construction also provides liquid passages of gradually decreasing area.

The advantages of the present invention arise from the provision of means in a heater of this character for effectively breaking up the liquid to be heated irrespective of the volume of flow of such liquid.

I claim:

1. A liquid heater, comprising a heating chamber having means for supplying a heating medium thereto, means for supplying the liquid to be heated and imparting a rotary motion thereto, means for varying the discharge area of said means as the flow of liquid varies, and means for varying the pressure effective on said area as the area varies, substantially as described.

2. A liquid heater, comprising a heating chamber having means for supplying a heating medium, a liquid supply, movable means cooperating with said liquid supply, said means having a flow passage of gradually changing cross-section for imparting a rotary motion to the liquid, and means movable with said means for varying the pressure effective on said flow passage with each change of movement thereof, substantially as described.

3. A liquid heater, comprising entrance ports for the liquid to be heated and for the heating fluid, a valve controlling the flow of liquid to be heated, and means for imparting a constant rotary motion to such liquid irrespective of the extent of opening of the valve, substantially as described.

4. A liquid heater, comprising entrance ports for the liquid to be heated and for the heating fluid, a valve controlling the flow of liquid to be heated, movable means for imparting rotary motion to the liquid to be heated, and means controlling the movement of said valve and said means, substantially as described.

5. A liquid heater, comprising entrance ports for the liquid to be heated and for the heating fluid, a reservoir for the heated fluid, a combined valve and means for imparting rotary motion to the liquid to be heated, the valve being located before said means with respect to liquid flow, and a float in said reservoir controlling the movement of said valve and said means, substantially as described.

6. A liquid heater, comprising a chamber having means for supplying a treating medium, a liquid supply, a control for the liquid supply, means for imparting a rotary motion to the liquid delivered to the chamber, said last mentioned means having a variable outlet, and means for varying the outlet as the control is varied, substantially as described.

7. In a liquid treating apparatus, a chamber having an inlet port, adjustable means cooperating with said port and having a flow passage of gradually decreasing cross-sectional area in the direction of flow for uniformly breaking up the liquid flowing therethrough irrespective of changes in the volume of flow within the capacity of said means, and a control valve connected to and movable with said adjustable means for controlling the flow of liquid thereto, substantially as described.

8. In a liquid treating apparatus, a chamber having an inlet port, adjustable spraying means cooperating with said port and having a flow passage of gradually decreasing cross-sectional area in the direction of flow for uniformly breaking up the liquid flowing therethrough irrespective of the changes in the volume of flow within the capacity of said means, and a valve determining the effective pressure on the spraying means, substantially as described.

9. In a liquid treating apparatus, a chamber having an inlet port, automatically adjustable means cooperating with said port and having a flow passage of gradually decreasing cross-sectional area in the direction of flow for uniformly breaking up the liquid passing therethrough irrespective of changes in the volume of flow within the capacity of said means, and means controlling the flow to said adjustable means, substantially as described.

In testimony whereof I have hereunto set my hand.

RAYMOND N. EHRHART.